United States Patent
Gerton et al.

(10) Patent No.: US 8,077,388 B2
(45) Date of Patent: Dec. 13, 2011

(54) LIGHT POLARIZATION CONVERTER FOR CONVERTING LINEARLY POLARIZED LIGHT INTO RADIALLY POLARIZED LIGHT AND RELATED METHODS

(75) Inventors: Jordan M. Gerton, Salt Lake City, UT (US); Jonathan R. Cox, Lee's Summit, MO (US); Benjamin D. Mangum, Salt Lake City, UT (US); Jeff Jensen, Bountiful, UT (US); Jason Ho, Columbus, OH (US)

(73) Assignee: University of Utah Research Foundation, Salt Lake City, UT (US)

( * ) Notice: Subject to any disclaimer, the term of this patent is extended or adjusted under 35 U.S.C. 154(b) by 766 days.

(21) Appl. No.: 12/142,096

(22) Filed: Jun. 19, 2008

(65) Prior Publication Data
US 2009/0316263 A1 Dec. 24, 2009

Related U.S. Application Data

(60) Provisional application No. 60/972,096, filed on Sep. 13, 2007.

(51) Int. Cl.
*G02B 5/30* (2006.01)
(52) U.S. Cl. .............. 359/486.03; 359/490.01; 362/19
(58) Field of Classification Search ............ 359/486.01, 359/486.02, 486.03, 489
See application file for complete search history.

(56) References Cited

U.S. PATENT DOCUMENTS

| | | | | |
|---|---|---|---|---|
| 3,941,476 A | * | 3/1976 | Stauffer | 356/3 |
| 7,265,816 B2 | * | 9/2007 | Tsuji | 355/71 |
| 2005/0286038 A1 | * | 12/2005 | Albert et al. | 355/71 |
| 2006/0055909 A1 | * | 3/2006 | Fiolka et al. | 355/71 |
| 2007/0159694 A1 | * | 7/2007 | Brown et al. | 359/489 |

OTHER PUBLICATIONS

M. Stalder, M. Schadt, 'Linearly polarized light with axial symmetry generated by liquid-crystal polarization converters', Opt. Lett., vol. 21, No. 23, Dec. 1, 1996, pp. 1948-1950.*
K. Youngworth, D. Biss, T. Brown, 'Point spread functions for particle imaging using inhomogeneous polarization in scanning optical microscopy', Proc. SPIE, vol. 4261, Jan. 2001, pp. 14-23.*

* cited by examiner

*Primary Examiner* — Arnel C Lavarias
(74) *Attorney, Agent, or Firm* — Workman Nydegger

(57) ABSTRACT

The conversion of linear polarized light into radial-polarized light is accomplished through a radial polarization generator containing multiple layers of polarizing film, or polarization converters, for converting the beam of light to a different orientation. Using the radial polarization generator, a quasi radial-polarized beam of light can be obtained quickly and easily by simply aligning the light at the center of the polarization generator. True radial-polarization can be obtained by passing the laser through a spatial filter. With such a radial polarization generator, a large frequency range of light may be converted from a linear orientation to a radial orientation.

13 Claims, 1 Drawing Sheet

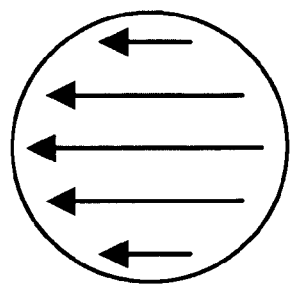
FIG. 1A
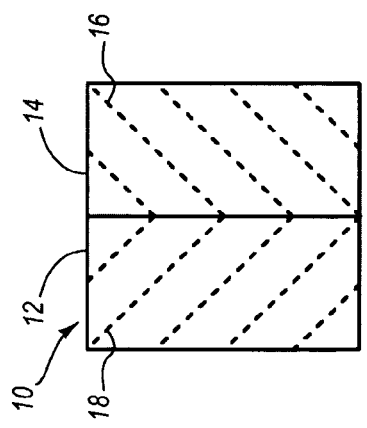
FIG. 1B
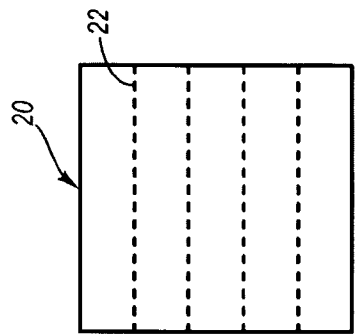
FIG. 1C
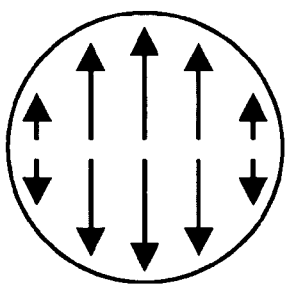
FIG. 1E
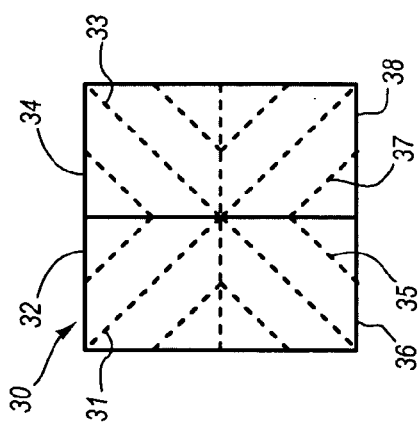
FIG. 1F
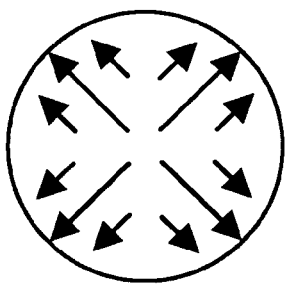
FIG. 1G
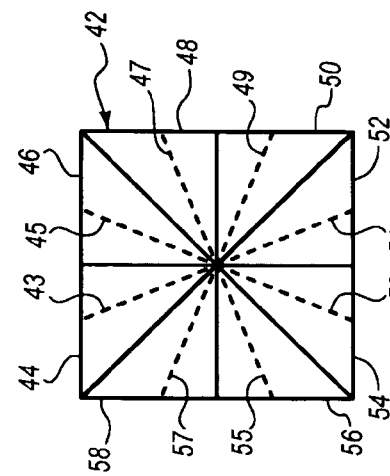
FIG. 1D
FIG. 1H

LIGHT POLARIZATION CONVERTER FOR CONVERTING LINEARLY POLARIZED LIGHT INTO RADIALLY POLARIZED LIGHT AND RELATED METHODS

CROSS-REFERENCE TO RELATED APPLICATIONS

This application claims the benefit of U.S. Provisional Patent Application No. 60/942,096, entitled METHODS AND APPARATUS FOR PRODUCING RADIAL POLARIZED LIGHT, filed Sep. 13, 2007, the disclosure of which is incorporated herein by reference in its entirety.

BACKGROUND

1. Technical Field

This application relates generally to methods and apparatus for polarizing light. In particular, this application relates to methods and apparatus for converting linear-polarized light into radial-polarized light.

2. The Relevant Technology

Radial polarization of light can produce light that has a tighter focus and thus can achieve an approximately 38% higher resolution than what is considered to be the standard diffraction limit. Radial-polarized light has applications in near-field optics, confocal microscopy devices, atom trapping, optical tweezers, and material processing.

Radial polarization generators are known to convert linear-polarized light into radial-polarized light. For example, in laser applications, radial-polarized laser beams can be focused more tightly than laser beams with other polarization states (such as linear or circular polarizations), leading to finer spatial resolution in any laser-scanning microscopy technique. Additionally, at the focus of radial-polarized laser beams there exists a strong electric-field component along the propagation axis of the laser, the optic axis. Thus, radial-polarized laser beams can be used to preferentially probe particles, such as fluorophores like molecules and quantum dots, which are oriented along this axis among all the particles within a heterogeneous system. In addition, radial-polarized beams are important for nanometer-scale apertureless near-field scanning optical microscopy, where a sharp tip most effectively scatters laser light when it is polarized in the same direction as the tip axis. Using radial-polarized light focused at the tip allows for laser illumination along the tip axis, which enables nanometer-scale resolution.

Present methods and apparatus for producing radial polarized light from linear-polarized light are limited in that they are dependent on the wavelength of the originating light. Moreover, these methods and apparatus can be difficult and expensive to implement and manufacture.

BRIEF SUMMARY

This application relates to methods and apparatus for converting linear polarized light into radial-polarized light. The polarization is accomplished through a radial polarization generator containing multiple layers of polarizing film, or polarization converters, for converting the beam of light to a different orientation. Using the radial polarization generator, a quasi radial-polarized beam of light can be obtained quickly and easily by simply aligning the light at the center of the polarization generator. True radial-polarization can be obtained by passing the laser through a spatial filter. With such a radial polarization generator, a large frequency range of light may be converted from a linear orientation to a radial orientation.

In one implementation of the present invention, a method for modifying the polarization of light comprises three light conversion steps. In the first step, a linear-polarized light oriented in a first direction is converted to a first polarized light oriented at about 45 degrees to the first direction. The first polarized light is then converted to a second polarized light oriented at about 90 degrees to the first direction. Finally, the second polarized light is converted to a third polarized light oriented substantially in a quasi-radial direction.

In another implementation of the present invention, a method for modifying the polarization of light comprises passing a linear-polarized light oriented in a first direction through a first converter. The first converter contains a first polarizing film with a transmission axis at about +45 degrees with respect to the first direction and a second polarizing film with a transmission axis at about −45 degrees with respect to the first direction to create a second polarized light. The second polarized light is then passed through a second converter containing a third polarizing film having a transmission axis at about 90 degrees relative to the first direction to create a third polarized light. The third polarized light is then passed through a third converter containing four polarizing films each having a polarizing film with a transmission axis of 45 degrees and an angle of 90 degrees between the transmission axis of any adjacent polarizing film.

In yet another implementation of the present invention, a method for producing nearly radial polarized light comprises passing light through three polarization converters. In particular, a linear-polarized light is passed through a first polarization converter to produce a first stage polarized light. The first layer of polarized material includes a first polarizing film coupled to a second polarizing film. The first polarizing film has a transmission axis at 45-degrees with respect to a vertical axis, and the second polarizing film has a transmission axis at negative 45-degrees with respect to the vertical axis. Next, the first stage polarized light is passed through a second polarization converter to produce a second stage polarized light. The second polarization converter includes a third polarizing film having a transmission axis at horizontal. The second stage polarized light is then passed through a third polarization converter to produce a nearly radial polarized light. The third polarization converter includes four polarizing films. Each of the four polarizing films has a transmission axis at 45 degrees with respect to vertical and an angle of 90 degrees between the transmission axis of adjacent polarizing films.

In still yet other implementations of the present invention, a converter for modifying the polarization of light includes at least three polarization converters. The first polarization converter contains a first polarizing film having a transmission axis at about +45 degrees with respect to a first direction and a second polarizing film having a transmission axis at about −45 degrees with respect to the first direction. The second polarization converter contains a third polarizing film having a transmission axis at about 90 degrees relative to the first direction. The third polarization converter contains four polarizing films each having a polarizing film with a transmission axis of 45 degrees and an angle of 90 degrees between the transmission axis of any adjacent polarizing film.

According to one implementation of the present invention, a system for modifying the polarization of light comprises a light source and a converter for modifying the polarization of that light. The light source is adapted to transmit light in a first direction. The converter includes three polarization converters. The first polarization converter contains a first polarizing film having a transmission axis at about +45 degrees with respect to the first direction and a second polarizing film having a transmission axis at about −45 degrees with respect to the first direction. The second polarization converter contains a third polarizing film having a transmission axis at about 90 degrees relative to the first direction. The third polarization converter contains four polarizing films each having a polarizing film with a transmission axis of 45 degrees and an angle of 90 degrees between the transmission axis of any adjacent polarizing film.

BRIEF DESCRIPTION OF THE DRAWINGS

The following description can be better understood in light of the Figures, in which:

FIG. 1A depicts the polarization of incoming light prior to passing through a first polarization converter;

FIG. 1B depicts an example of a first polarization converter;

FIG. 1C depicts the polarization of light after passing through the first polarization converter of FIG. 1B and prior to passing through a second polarization converter;

FIG. 1D depicts an example of a second polarization converter;

FIG. 1E depicts the polarization of light after to passing through the second polarization converter of FIG. 1D and prior to passing through the third polarization converter;

FIG. 1F depicts an example of third polarization converter;

FIG. 1G depicts the polarization of light after to passing through the third polarization converter of FIG. 1F; and FIG. 1H depicts an example of another polarization converter.

Together with the following description, the Figures demonstrate and explain the principles of the systems and methods for converting linear polarized light into radial-polarized light. In the Figures, the thickness and configuration of components may be exaggerated for clarity. The same reference numerals in different Figures represent the same component.

DETAILED DESCRIPTION

The following description provides specific details in order to provide a thorough understanding. Nevertheless, the skilled artisan would understand that the apparatus and methods can be practiced without employing these specific details. Indeed, the apparatus and methods can be practiced by modifying them and can be used in conjunction with systems and techniques conventionally used in the industry. For example, while the polarization generator is described for use with lasers, it could be used and adapted for the entire visible light spectrum.

The radial polarization generator includes a series of polarizing layers, or polarization converters, that convert a linear-polarized light into radial-polarized light. The minimum number of polarizing layers needed to convert a linear-polarized light into radial-polarized light is two. The upper limit of the number of polarizing layers is theoretically unlimited, but can depend on the light absorption properties. As the light propagates through each of the polarizing layers, some light is absorbed due to Mallus' Law. To compensate for the absorption, a higher intensity of incident light can be used.

The material for the polarization converters can be any polarizing film. Examples of polarizing films includes those made of chain polymers in certain alignments. The polarization converters can be connected to each other using any known mechanism, such as by optical adhesives, but the layers are not required to be joined. The converters are aligned with each other along a central axis so that the center of each is positioned along the transmission axis of the light beam.

Once the polarizing films are properly aligned, they are oriented so that they collectively convert linear-polarized light to quasi-radial polarized light. One example of the orientation of the converters is illustrated in FIGS. 1B, 1D, 1F, and optionally 1H. This orientation is used for incoming light that is vertical (as shown in FIG. 1A). But if the incoming light is horizontal, the orientations in these Figures are rotated by 90 degrees. If the incoming light is anywhere between vertical or horizontal, the orientation of the radial-polarizer is rotated by an angle equal to the angle of the incoming linear-polarized light relative to the vertical or horizontal axis.

The incoming light may come from any known light sources, including Nd:YAG, Argon ion, semiconductor diode, Ti-sapphire, or other laser source, arc source, or the like. Moreover, the various light sources may be interchanged according to the desired frequency or frequencies without modifying the optical setup, as will be understood by those of skill in the art. These frequencies can include various frequencies and frequency ranges, particularly those of the UV, IR, and visible ranges, depending on the polarizer.

In the embodiments shown in the Figures, the first polarization converter 10, is shown in FIG. 1B This first polarization converter includes two pieces of film 12 and 14 that are coupled together with their transmission axes 16 and 18 aligned at an approximate 45 degree angle with respect to the vertical axis, as shown. The angle between the two transmission axes is about 90 degrees. The two pieces of film can be coupled together with any known mechanism, such as any optical adhesive. The resulting light polarization of the beam passing through this first polarization converter is shown in FIG. 1C.

This resulting beam then passes through the second polarization converter 20. The second polarization converter 20 contains a single piece of polarizing film. This second polarization converter is positioned with the transmission axis 22 being substantially horizontal. The resulting light polarization of the beam passing through this second polarization converter is shown in FIG. 1E, which comprises a quasi $TEM_{10}$ mode beam of light.

This resulting beam of light then passes through the third polarization converter 30, shown in FIG. 1F. This third polarization converter includes four quadrants (32, 34, 36, 38) of polarizing films coupled together, as described above. Each quadrant of polarizing film has a transmission axis at 45-degrees with respect to the vertical axis, as depicted in FIG. 1F. The angle between the transmission axes 31, 33, 35, and 37 of each quadrant is 90-degrees with respect to the adjacent quadrants. The light beam passing through this third polarization converter 30 results in a quasi-radial polarized light beam, as shown in FIG. 1G. This light beam includes four quadrants where the electric field in each quadrant points along the axis that dissects the quadrants. The phase relationship between the light from the four quadrants is such that opposite quadrants are 180 degrees out of phase.

In some embodiments, additional polarization converters may be included in the polarization generator to result in more radial polarized light. With each such subsequent polarization converter, the number of segments is twice the number of previous segments as contained in the previous polarizer. Accordingly, the angular difference of the orientation of the transmission axes between the adjacent films is half that of the previous polarizer.

For example, another polarization converter can be used and includes eight segments of film (44, 46, 48, 50, 52, 54, 56, and 58) coupled together and positioned radially, wherein two sections of four films are symmetrically positioned on opposite sides of a center vertical coupling. Each film has a transmission axis 43, 45, 47, 49, 51, 53, 55, and 57 that is parallel to a radial line from the center of the polarizer, as shown in FIG. 1H. The angle between the transmission axes of each segment of film is 45-degrees. This fourth polarizer is positioned so that its center is positioned along the transmission axis of the light beam. Similarly, a fifth polarization converter could be used and could include sixteen triangular segments, where the angle between the transmission axes of each segment of film is 22.5-degrees. Likewise, a sixth polarization converter could include thirty-two triangular segments, where the angle between the transmission axes of each segment of film is 11.25-degrees.

Optionally, the polarization generator can also contain a spatial-mode filter. After the beam of light passes through the polarization converters (10, 20, 30) it can pass through a standard spatial-mode filter, which includes a focusing lens and a pinhole, that will result in a more defined radial polarization. However, passing the light beam through the spatial-mode filter can result in some loss of transmitted power for the light.

Using such a polarization generator as described above provides several advantages. First, it is not dependent on the wavelength of the originating light because the individual polarization converters are not sensitive to wavelengths in a specific range. Second, the cost of production of this polarization generator can be substantially less than current commercial radial-polarizers. Finally, those of skill in the art will be able to fabricate this device in a very compact package that can be integrated into existing commercial systems, such as inverted and confocal optical microscopes.

In addition to any previously indicated variations, numerous other modifications and alternative arrangements may be devised by those skilled in the art without departing from the spirit and scope of the invention and the appended claims are intended to cover such modifications and arrangements. Thus, while the invention has been described above with particularity and detail in connection with what is presently deemed to be the most practical and preferred aspects of the invention, it will be apparent to those of ordinary skill in the art that numerous modifications, including but not limited to, form, function, manner of operation and use may be made without departing from the principles and concepts set forth herein.

What is claimed is:

1. A method for modifying the polarization of light, comprising:
    passing a linear-polarized light oriented in a first direction through a first converter containing (i) a first polarizing film having a transmission axis at about +45 degrees with respect to the first direction, and (ii) a second polarizing film having a transmission axis at about −45 degrees with respect to the first direction to create a first polarized light;
    passing the first polarized light through a second converter containing a third polarizing film having a transmission axis at about 90 degrees relative to the first direction to create a second polarized light; and
    passing the second polarized light through a third converter containing four polarizing films to create a third polarized light, each of the four polarizing films having a transmission axis at about 45 degrees with respect to the first direction and at an angle of about 90 degrees between the transmission axis of any adjacent polarizing film.

2. The method of claim 1, further comprising passing the third polarized light through a standard spatial-mode filter comprising a focusing lens and a pinhole.

3. The method of claim 1, further comprising passing the third polarized light through a fourth converter to create a fourth polarized light, the fourth converter containing eight transmission axis, each of the transmission axis being offset by about 45 degrees from adjacent transmission axis.

4. The method of claim 3, further comprising sequentially passing the fourth polarized light through multiple subsequent converters to create substantially radial polarized light, wherein each of the subsequent converters comprises twice the number of transmission axis as the immediately previous converter.

5. The method of claim 4, wherein the angular difference of the transmission axis orientation between adjacent converters is half that of the previous converter.

6. A method for producing nearly radial polarized light, comprising:
    passing a linear-polarized light through a first polarization converter to produce a first stage polarized light, wherein the first layer of polarized material includes a first polarizing film coupled to a second polarizing film, the first polarizing film having a transmission axis at 45-degrees with respect to a vertical axis, and the second polarizing film having a transmission axis at negative 45-degrees with respect to the vertical axis;
    passing the first stage polarized light through a second polarization converter to produce a second stage polarized light, wherein the second polarization converter includes a third polarizing film having a transmission axis generally aligned with a horizontal axis; and
    passing the second stage polarized light through a third polarization converter to produce a nearly radial polarized light, the third polarization converter includes four polarizing films, wherein each of the four polarizing film has a transmission axis at 45 degrees with respect to the vertical axis and an angle of about 90 degrees between the transmission axis of adjacent polarizing films.

7. The method of claim 6, further comprising passing the nearly radial polarized light through a standard spatial-mode filter, wherein the spatial mode filter includes a focusing lens and a pinhole.

8. The method of claim 6, further comprising passing the nearly radial polarized light through a fourth layer of polarized material to produce a more-nearly radial polarized light, wherein the fourth layer of polarized material includes eight polarizing films, wherein each polarizing film has a transmission axis approximately parallel to a radial line from a center of the polarizing films and an angle of about 45 degrees between the transmission axis of adjacent polarizing films.

9. A converter for modifying the polarization of light, comprising:
    a first polarization converter containing a first polarizing film having a transmission axis at about +45 degrees with respect to a first direction and a second polarizing film having a transmission axis at about −45 degrees with respect to the first direction;
    a second polarization converter containing a third polarizing film having a transmission axis at about 90 degrees relative to the first direction; and
    a third polarization converter containing four polarizing films each having a transmission axis of about 45 degrees with respect to the first direction and at an angle of about 90 degrees between the transmission axis of any adjacent polarizing film.

10. The converter of claim 9, further comprising a spatial-mode filter comprising a focusing lens and a pinhole.

11. The converter of claim 9, further comprising a fourth polarization converter containing eight polarizing films each having a transmission axis, an angle between each of the transmission axis being about 45 degrees.

12. A system for modifying the polarization of light, the system comprising:
 a light source for transmitting light having a first direction; and
 a converter for modifying the polarization of the light, the converter containing:
  a first polarization converter containing a first polarizing film having a transmission axis at about +45 degrees with respect to the first direction and a second polarizing film having a transmission axis at about −45 degrees with respect to the first direction;
  a second polarization converter containing a third polarizing film having a transmission axis at about 90 degrees relative to the first direction; and
  a third polarization converter containing four polarizing films, wherein each of the polarizing films has a transmission axis of about 45 degrees with respect to the first direction and at an angle of about 90 degrees between the transmission axis of any adjacent polarizing film.

13. The system of claim 12, the converter further comprising a spatial mode filter containing a focusing lens and a pinhole.

* * * * *